United States Patent
Zhang et al.

(10) Patent No.: US 11,627,570 B2
(45) Date of Patent: Apr. 11, 2023

(54) METHOD AND APPARATUS FOR SLOT STRUCTURE INDICATION

(71) Applicant: ZTE CORPORATION, Guangdong (CN)

(72) Inventors: Chenchen Zhang, Guangdong (CN); Peng Hao, Guangdong (CN); Xing Liu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 226 days.

(21) Appl. No.: 16/871,655

(22) Filed: May 11, 2020

(65) Prior Publication Data
US 2020/0275443 A1    Aug. 27, 2020

Related U.S. Application Data

(63) Continuation of application No. PCT/CN2017/111744, filed on Nov. 17, 2017.

(51) Int. Cl.
| | | |
|---|---|---|
| *H04W 72/04* | (2009.01) | |
| *H04L 5/14* | (2006.01) | |
| *H04L 5/00* | (2006.01) | |
| *H04W 72/0446* | (2023.01) | |

(52) U.S. Cl.
CPC ....... *H04W 72/0446* (2013.01); *H04L 5/0007* (2013.01); *H04L 5/0046* (2013.01); *H04L 5/14* (2013.01); *H04W 72/042* (2013.01)

(58) Field of Classification Search
CPC ..... H04L 5/003; H04L 5/0046; H04L 5/0007; H04L 27/26025; H04L 5/14; H04L 5/0094; H04W 72/0446; H04W 72/042
See application file for complete search history.

(56) References Cited

U.S. PATENT DOCUMENTS

| | | |
|---|---|---|
| 2016/0119820 A1 | 4/2016 | Lin et al. |
| 2017/0332359 A1 | 11/2017 | Tsai et al. |
| 2017/0332396 A1 | 11/2017 | Liao et al. |
| 2019/0150124 A1* | 5/2019 | Nogami ............... H04L 5/0094 370/330 |

(Continued)

FOREIGN PATENT DOCUMENTS

CN    107079420 A    8/2017

OTHER PUBLICATIONS

LG Electronics, "Discussion on group common PDCCH", 3GPP TSG RAN WG1 #90bis, R1-1717953, Praha, Czech Republic, Oct. 3, 2017 (Oct. 3, 2017), 11 pages.

(Continued)

*Primary Examiner* — Maharishi V Khirodhar
*Assistant Examiner* — Kenneth P Hunt
(74) *Attorney, Agent, or Firm* — Duane Morris LLP

(57) ABSTRACT

A method and apparatus for slot structure indication is disclosed. In one embodiment, a method performed by a wireless communication node, comprising: configuring at least one first SFI entry set to a wireless communication device, wherein the at least one SFI entry set contains slot structure information of at least one transmission resource; and transmitting a physical channel to a wireless communication device, wherein the physical channel comprises at least one slot format related information (SFI) field.

10 Claims, 6 Drawing Sheets

(56) References Cited

U.S. PATENT DOCUMENTS

2020/0260417 A1* 8/2020 Jo ..................... H04W 72/0446
2020/0275417 A1* 8/2020 Takeda ................. H04L 5/0007

OTHER PUBLICATIONS

Xiaomi, "Discussion on the content and structure of group common PDCCH", 3GPP TSG RAN WG1 Meeting NR#3, R1-1716565, Nagoya, Japan, Sep. 17, 2017 (Sep. 17, 2017), 5 pages.
Samsung, "On UE-Group Common PDCCH", 3GPP TSG RAN WG1 #90bis, R1-1717643, Prague, Czech Republic, Oct. 8, 2017 (Oct. 8, 2017), 4 pages.
LGE Panasonic Catt, "WF on SFI", 3GPP TSG RAN WG1 #90, R1-1715081, Prague, Czech Republic, Aug. 26, 2017 (Aug. 26, 2017), 2 pages.
ZTE, "Contents for Group-common PDCCH", 3GPP TSG RAN WG1 Meeting #90, R1-1712445, Prague, Czechia, Aug. 20, 2017 (Aug. 20, 2017), 4 pages.
NTT Docomo, Inc., "Remaining issues on group-common PDCCH", 3GPP TSG RAN WG1 Meeting #90bis, R1-1718205, Prague, Czech Republic, Oct. 13, 2017 (Oct. 13, 2017), 13 pages.
Catt, "Remaining design aspects of slot format indication", 3GPP TSG RAN WG1 Meeting #90bis, R1-1717824, Prague, Czech Republic, Oct. 13, 2017 (Oct. 13, 2017), 8 pages.

* cited by examiner

METHOD AND APPARATUS FOR SLOT STRUCTURE INDICATION

TECHNICAL FIELD

This disclosure relates generally to wireless communications and, more particularly, to a method and apparatus for slot structure indication.

BACKGROUND

With the continuous development of wireless communication technologies, a wide range of wireless communication services are emerging, which will greatly increase the demand for bandwidth in wireless communication systems. Thus, the traditional frequency range of 300 MegaHertz (MHz) to 3 GigaHertz (GHz) for commercial communication systems must be utilized more efficiently in order to meet the market demand for future wireless communication services.

Over the past few decades, mobile communications have evolved from voice services to high-speed broadband data services. With further development of new types of businesses and applications, e.g. the mobile Internet and Internet of Things (IoT), the demands on data on mobile networks will continue to increase exponentially. Based on diversified business and application requirements in future mobile communications, wireless communication systems should meet a variety of requirements, such as throughput, latency, reliability, link density, cost, energy consumption, complexity, and coverage.

An LTE (Long-Term Evolution) system can support performing FDD (Frequency Division Duplex) operation on a pair of spectrums (e.g. performing downlink on one carrier and uplink on another carrier). It also supports TDD (Time Division Duplex) operation on an unpaired carrier. In a conventional TDD operation mode, only a limited number of configurations of uplink and downlink sub-frame allocations (corresponding to configuration 0 to configuration 6) are utilized. Adjacent areas use a same configuration, that is, with the same direction of transmission. The technology of eIMTA (enhanced interference mitigation and traffic adaptation) can configure semi-statically (at 10 ms or more) the uplink and downlink of the LTE system, and make adjacent areas use different configurations of TDD uplink and downlink sub-frame allocations. But these configurations are still limited to the several configurations described above.

Future wireless communication systems, such as the 5G/New Radio (NR) system, will support dynamic TDD operations, flexible Duplexing (or Duplexing flexibility) operations, and full Duplexing operations, in order to meet the fast adaptive requirements of the business and to further improve the efficiency of spectrum utilization. Taking dynamic TDD as an example, a dynamic TDD operation refers to dynamically or semi-dynamically changing the transmission direction as uplink or downlink, on the unpaired spectrum (or on the uplink or downlink carriers in the paired spectrum). Compared to eIMTA, dynamic TDD operations can support direction changes in a sub-frame level, a time slot level, or in an even more dynamic level. While an eIMTA system utilizes physical downlink control channel (PDCCH) to indicate TDD sub-frame configurations, a 5G/NR system will use group-common PDCCH (GC-PDCCH) to notify a group of terminals and/or users about some control information, e.g. slot format related information (SFI). For example, a base station (BS) in a 5G/NR system can indicate SFI via a group-common PDCCH to notify a group of terminals about channel structure information of a transmission link between the BS and each terminal within one or more time slots. The channel structure may include a pattern of transmission attributes, e.g. downlink (DL), uplink (UL), and/or OTHER of the transmission link.

There is no satisfactory solution in existing literatures or existing technologies for any of the following issues: (a) how the terminal can understand an SFI indication when a SFI can be used to indicate multiple carriers, (b) how the terminal can properly get properly configured with a GC-PDCCH monitoring period to monitor the SFI indication; and (c) how the terminal can derive a FDD SFI table from a TDD SFI table.

SUMMARY OF THE INVENTION

The exemplary embodiments disclosed herein are directed to solving the issues related to one or more problems presented in the prior art, as well as providing additional features that will become readily apparent by reference to the following detailed description when taken in conjunction with the accompany drawings. In accordance with some embodiments, exemplary systems, methods, and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In one embodiment, a method performed by a wireless communication node, comprising: a method performed by a wireless communication node, comprising: configuring at least one first SFI entry set to a wireless communication device, wherein the at least one SFI entry set contains slot structure information of at least one transmission resource; and transmitting a physical channel to a wireless communication device, wherein the physical channel comprises at least one slot format related information (SFI) field.

In another embodiment, a method performed by a wireless communication node, comprising: transmitting a group common physical downlink control channel (GC-PDCCH) to a wireless communication device, wherein the physical channel comprises at least one slot format related information (SFI) field; and configuring a period of a GC-PDCCH monitoring occasion for a wireless communication device to receive the at least one SFI field for SFI indication.

Yet in another embodiment, a method performed by a wireless communication device, comprising: receiving at least one first SFI entry set from a wireless communication node, wherein the at least one SFI entry set contains slot structure information of at least one transmission resource; configuring at least one second SFI entry set; and receiving a physical channel from the wireless communication node, wherein the physical channel comprises at least one slot format related information (SFI) field.

Yet, in another embodiment, a method performed by a wireless communication device, comprising: receiving a group common physical downlink control channel (GC-PDCCH) from a wireless communication node, wherein the GC-PDCCH comprises at least one slot format related information (SFI) field; receiving a period of a GC-PDCCH monitoring occasion from the wireless communication node to receive the at least one SFI field for SFI indication; and performing GC-PDCCH monitoring to receive the at least one SFI field.

BRIEF DESCRIPTION OF THE DRAWINGS

Aspects of the present disclosure are best understood from the following detailed description when read with the accompanying figures. It is noted that various features are not necessarily drawn to scale. In fact, the dimensions and geometries of the various features may be arbitrarily increased or reduced for clarity of discussion.

DETAILED DESCRIPTION OF EXEMPLARY EMBODIMENTS

Figure 1A:
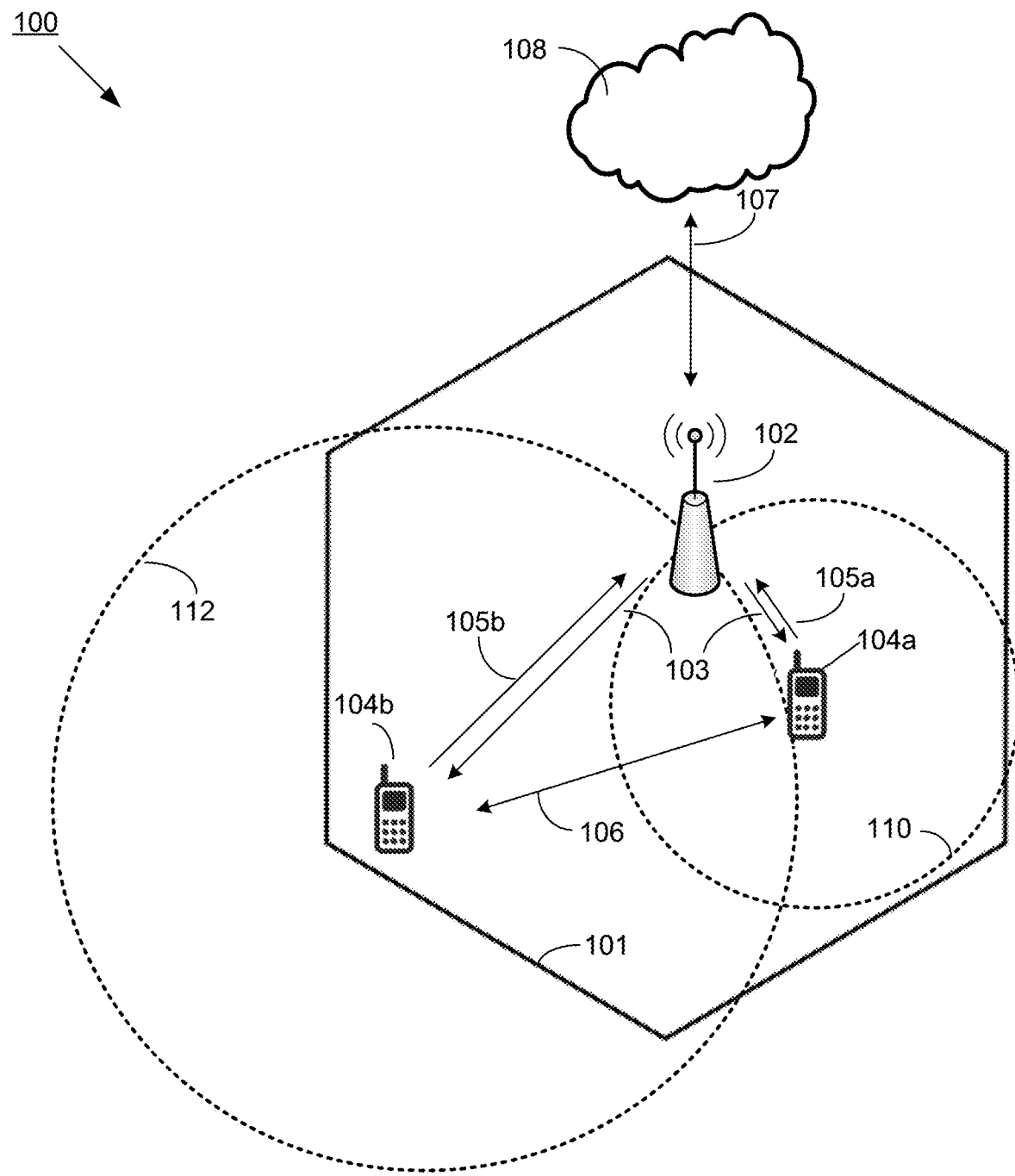
FIG. 1A illustrates an exemplary wireless communication network, in accordance with some embodiments of the present disclosure.

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described or illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

Embodiments of the present invention are described in detail with reference to the accompanying drawings. The same or similar components may be designated by the same or similar reference numerals although they are illustrated in different drawings. Detailed descriptions of constructions or processes well-known in the art may be omitted to avoid obscuring the subject matter of the present invention. Further, the terms are defined in consideration of their functionality in embodiment of the present invention, and may vary according to the intention of a user or an operator, usage, etc. Therefore, the definition should be made on the basis of the overall content of the present specification.

FIG. 1A illustrates an exemplary wireless communication network 100, in accordance with some embodiments of the present disclosure. In a wireless communication system, a network side communication node or a base station (BS) can be a node B, an E-utran Node B (also known as Evolved Node B, eNodeB or eNB), a pico station, a femto station, or the like. A terminal side node or a user equipment (UE) can be a long range communication system like a mobile phone, a smart phone, a personal digital assistant (PDA), tablet, laptop computer, or a short range communication system such as, for example a wearable device, a vehicle with a vehicular communication system and the like. A network and a terminal side communication node are represented by a BS 102 and a UE 104, respectively, which are generally referred to as "communication nodes" hereinafter in all the embodiments in this disclosure. Such communication nodes may be capable of wireless and/or wired communications, in accordance with some embodiments of the invention. It is noted that all the embodiments are merely preferred examples, and are not intended to limit the present disclosure. Accordingly, it is understood that the system may include any desired combination of UEs and BSs, while remaining within the scope of the present disclosure.

Referring to FIG. 1A, the wireless communication network 100 includes a BS 102 and a UE 104a, and a UE 104b. The BS 102 and the UEs 104 are contained within a geographic boundary of cell 101. A wireless transmission from a transmitting antenna of the UE 104 to a receiving antenna of the BS 102 is known as an uplink transmission, and a wireless transmission from a transmitting antenna of the BS 102 to a receiving antenna of the UE 104 is known as a downlink transmission. The UE 104a has a direct communication channel with the BS 102 operating at a first frequency f1 for downlink communication 103 and a second frequency f2 for uplink communication 105a. Similarly, the UE 104b also has a direct communication channel with the BS 102 operating at the first frequency f1 for downlink communication 103 and a third frequency f3 for uplink communication. In some embodiments, the second frequency f2 and the third frequency f3 are different from the first frequency f1. In some embodiments, the second frequency f2 and the third frequency f3 are different from each other. Therefore, the second frequency f2 and the third frequency f3 have different transmission characteristics, such as for example path loss, coverage, maximum transmission power, etc. In some embodiments, the bandwidth of the first frequency f1, the second frequency f2 and the third frequency f3 can be also different. In some embodiments, the second frequency f2 and the third frequency f3 may have different transmission characteristics on different bandwidth part, such as for example path loss, coverage, maximum transmission power, etc. Although only 2 UEs 104 are shown in FIG. 1A, it should be noted that any number of UEs 104 can be included in the cell 101 and are within the scope of this invention. In some embodiments, the coverage of uplink communication 105b is larger than that of the uplink communication 105a, as indicated by doted circles 112 and 110, respectively. The BS 102 is located at the intercept region of the coverage areas 110 and 112 in order for the BS 102 to perform uplink communication with the UE 104a and UE 104b in the cell 101.

When the UE 104b is at the extreme cell edge 101, e.g., with a longer distance between the BS 102 and UE 104b, path loss becomes significant, so the UE 104b will transmit at a maximum power over a long distance at the third frequency f3. As a result, the data rate is relatively low between BS 102 and UE 104b in this case. As the UE 104 moves closer to the BS 102 (i.e., UE104*a*), the path loss decreases and the signal level at the BS 102 increases, thus the SNR improves. In response, the BS 102 instructs the UE 104 to reduce power on the second frequency f2 to minimize interference to other UE's and/or the BS 102.

Power headroom (PHR) value is defined as the difference between the terminal maximum transmit power and the estimated power for UL communication, including shared channel transmission, sounding reference signal (SRS) transmission, and/or physical control channel (PUCCH) transmission. As discussed above, instead of having only one PH value for the cell 101, there are one PH value per uplink transmission resource due to their unique transmission characteristics associated with different uplink transmission resources.

The direct communication channels 105/103 between the UEs 104 and the BS 102 can be through interfaces such as an Uu interface, which is also known as UMTS (Universal Mobile Telecommunication System (UMTS) air interface. The direct communication channels (sidelink transmission) 106 between the UEs can be through a PC5 interface, which is introduced to address high moving speed and high density applications such as Vehicle-to-Vehicle (V2V) communications. The BS 102 is connected to a core network (CN) 108 through an external interface 107, e.g., an Iu interface.

The UEs 104*a* and 104*b* obtains its synchronization timing from the BS 102, which obtains its own synchronization timing from the core network 108 through an internet time service, such as a public time NTP (Network Time Protocol) server or a RNC (Radio Frequency Simulation System Network Controller) server. This is known as network-based synchronization. Alternatively, the BS 102 can also obtain synchronization timing from a Global Navigation Satellite System (GNSS) (not shown) through a satellite signal 106, especially for a large BS in a large cell which has a direct line of sight to the sky, which is known as satellite-based synchronization.

Figure 1B:
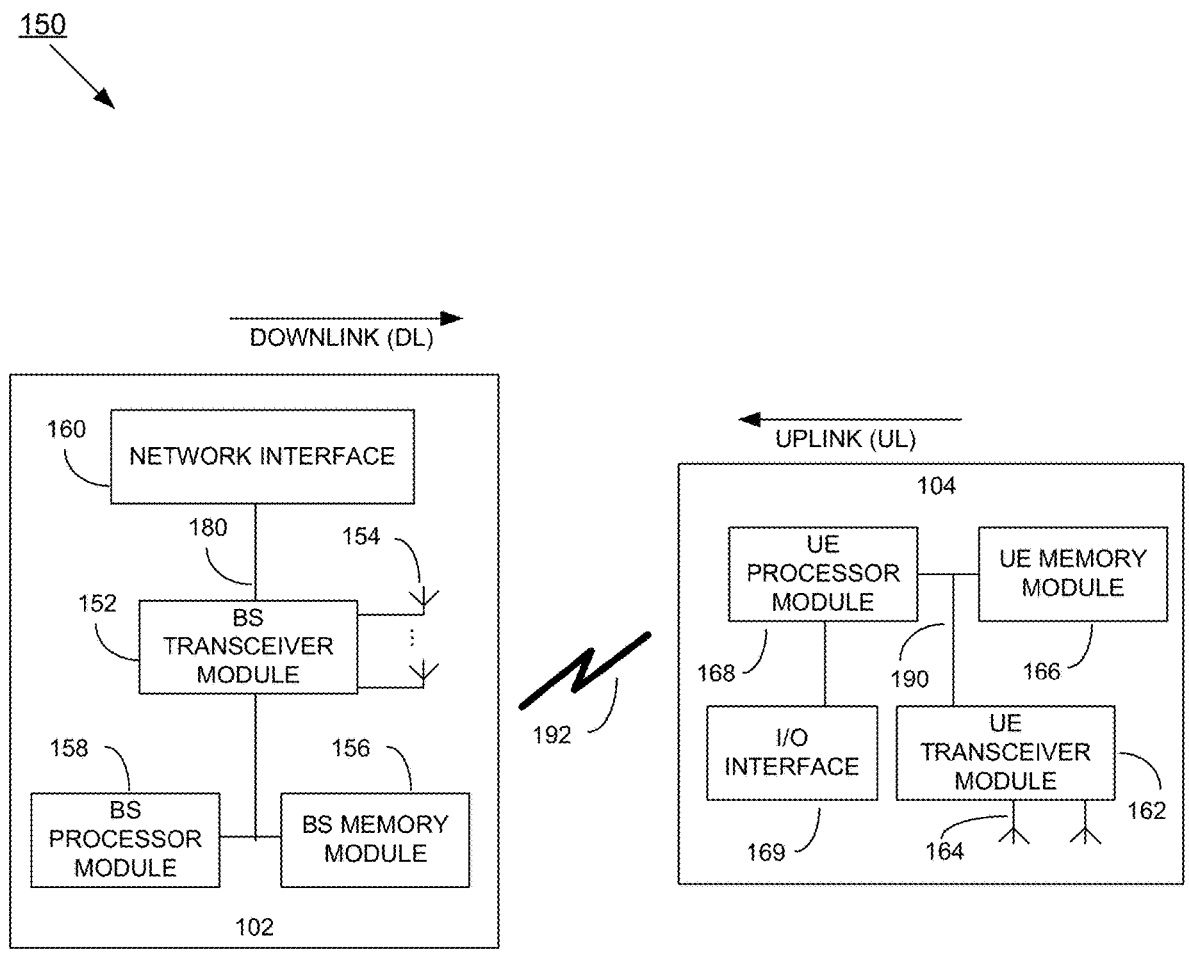
FIG. 1B illustrates a block diagram of an exemplary wireless communication system for a slot structure information indication, in accordance with some embodiments of the present disclosure.

FIG. 1B illustrates a block diagram of an exemplary wireless communication system 150 for a slot structure information indication, in accordance with some embodiments of the present disclosure. The system 150 may include components and elements configured to support known or conventional operating features that need not be described in detail herein. In one exemplary embodiment, system 150 can be used to transmit and receive data symbols in a wireless communication environment such as the wireless communication network 100 of FIG. 1A, as described above.

System 150 generally includes a BS 102 and two UEs 104*a* and 104*b*, collectively referred to as UE 104 below for ease of discussion. The BS 102 includes a BS transceiver module 152, a BS antenna array 154, a BS memory module 156, a BS processor module 158, and a network interface 160, each module being coupled and interconnected with one another as necessary via a data communication bus 180. The UE 104 includes a UE transceiver module 162, a UE antenna 164, a UE memory module 166, a UE processor module 168, and a I/O interface 169, each module being coupled and interconnected with one another as necessary via a date communication bus 190. The BS 102 communicates with the UE 104 via a communication channel 192, which can be any wireless channel or other medium known in the art suitable for transmission of data as described herein.

As would be understood by persons of ordinary skill in the art, system 150 may further include any number of blocks, modules, circuits, etc. other than those shown in FIG. 1B. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

A wireless transmission from a transmitting antenna of the UE 104 to a receiving antenna of the BS 102 is known as an uplink transmission, and a wireless transmission from a transmitting antenna of the BS 102 to a receiving antenna of the UE 104 is known as a downlink transmission. In accordance with some embodiments, a UE transceiver 162 may be referred to herein as an "uplink" transceiver 162 that includes a RF transmitter and receiver circuitry that are each coupled to the UE antenna 164. A duplex switch (not shown) may alternatively couple the uplink transmitter or receiver to the uplink antenna in time duplex fashion. Similarly, in accordance with some embodiments, the BS transceiver 152 may be referred to herein as a "downlink" transceiver 152 that includes RF transmitter and receiver circuitry that are each coupled to the antenna array 154. A downlink duplex switch may alternatively couple the downlink transmitter or receiver to the downlink antenna array 154 in time duplex fashion. The operations of the two transceivers 152 and 162 are coordinated in time such that the uplink receiver is coupled to the uplink UE antenna 164 for reception of transmissions over the wireless communication channel 192 at the same time that the downlink transmitter is coupled to the downlink antenna array 154. Preferably, there is close synchronization timing with only a minimal guard time between changes in duplex direction. The UE transceiver 162 communicates through the UE antenna 164 with the BS 102 via the wireless communication channel 192 or with other UEs via the wireless communication channel 193. The wireless communication channel 193 can be any wireless channel or other medium known in the art suitable for sidelink transmission of data as described herein.

The UE transceiver 162 and the BS transceiver 152 are configured to communicate via the wireless data communication channel 192, and cooperate with a suitably configured RF antenna arrangement 154/164 that can support a particular wireless communication protocol and modulation scheme. In some embodiments, the BS transceiver 152 is configured to transmit the physical downlink control channel (PDCCH) and configured slot structure related information (SFI) entry set to the UE transceiver 162. In some embodiments, the UE transceiver 162 is configured to receive PDCCH containing at least one SFI field from the BS transceiver 152. In some exemplary embodiments, the UE transceiver 162 and the BS transceiver 152 are configured to support industry standards such as the Long Term Evolution (LTE) and emerging 5G standards, and the like. It is understood, however, that the invention is not necessarily limited in application to a particular standard and associated protocols. Rather, the UE transceiver 162 and the BS transceiver 152 may be configured to support alternate, or additional, wireless data communication protocols, including future standards or variations thereof.

The BS processor modules 158 and UE processor modules 168 are implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Then the UE processor module 168 detects the PHR triggering message on the UE transceiver module 162, the UE processor module 168 is further configured to determine at least one second SFI entry set based on at least one predefined algorithm and the received at least one first SFI entry set configured by the BS 102, wherein the at least one predefined algorithm is selected based on other parameters calculated or messages received. The UE processor module 168 is further configured to generate the at least one second SFI entry set and monitor the PDCCH received on the UE transceiver module 162 to further receive the at least one SFI field. As used herein, "SFI entry set" means SFI table or SFI entries.

Furthermore, the steps of a method or algorithm described in connection with the embodiments disclosed herein may be embodied directly in hardware, in firmware, in a software module executed by processor modules 158 and 168, respectively, or in any practical combination thereof. The memory modules 156 and 166 may be realized as RAM memory, flash memory, ROM memory, EPROM memory, EEPROM memory, registers, a hard disk, a removable disk, a CD-ROM, or any other form of storage medium known in the art. In this regard, the memory modules 156 and 166 may be coupled to the processor modules 158 and 168, respectively, such that the processors modules 158 and 168 can read information from, and write information to, memory modules 156 and 166, respectively. The memory modules 156 and 166 may also be integrated into their respective processor modules 158 and 168. In some embodiments, the memory modules 156 and 166 may each include a cache memory for storing temporary variables or other intermediate information during execution of instructions to be executed by processor modules 158 and 168, respectively. Memory modules 156 and 166 may also each include non-volatile memory for storing instructions to be executed by the processor modules 158 and 168, respectively.

The network interface 160 generally represents the hardware, software, firmware, processing logic, and/or other components of the base station 102 that enable bi-directional communication between BS transceiver 152 and other network components and communication nodes configured to communication with the BS 102. For example, network interface 160 may be configured to support internet or WiMAX traffic. In a typical deployment, without limitation, network interface 160 provides an 802.3 Ethernet interface such that BS transceiver 152 can communicate with a conventional Ethernet based computer network. In this manner, the network interface 160 may include a physical interface for connection to the computer network (e.g., Mobile Switching Center (MSC)). The terms "configured for" or "configured to" as used herein with respect to a specified operation or function refers to a device, component, circuit, structure, machine, signal, etc. that is physically constructed, programmed, formatted and/or arranged to perform the specified operation or function. The network interface 160 could allow the BS 102 to communicate with other BSs or core network over a wired or wireless connection.

Referring again to FIG. 1A, as mentioned above, the BS 102 repeatedly broadcasts system information associated with the BS 102 to one or more UEs (e.g., 104) so as to allow the UE 104 to access the network within the cell 101 where the BS 102 is located, and in general, to operate properly within the cell 101. Plural information such as, for example, downlink and uplink cell bandwidths, downlink and uplink configuration, configuration for random access, etc., can be included in the system information, which will be discussed in further detail below. Typically, the BS 102 broadcasts a first signal carrying some major system information, for example, configuration of the cell 101 through a PBCH (Physical Broadcast Channel). For purposes of clarity of illustration, such a broadcasted first signal is herein referred to as "first broadcast signal." It is noted that the BS 102 may subsequently broadcast one or more signals carrying some other system information through respective channels (e.g., a Physical Downlink Shared Channel (PDSCH)), which are herein referred to as "second broadcast signal," "third broadcast signal," and so on.

Referring again to FIG. 1B, in some embodiments, the major system information carried by the first broadcast signal may be transmitted by the BS 102 in a symbol format via the communication channel 192. In accordance with some embodiments, an original form of the major system information may be presented as one or more sequences of digital bits and the one or more sequences of digital bits may be processed through plural steps (e.g., coding, scrambling, modulation, mapping steps, etc.), all of which can be processed by the BS processor module 158, to become the first broadcast signal. Similarly, when the UE 104 receives the first broadcast signal (in the symbol format) using the UE transceiver 162, in accordance with some embodiments, the UE processor module 168 may perform plural steps (demapping, demodulation, decoding steps, etc.) to estimate the major system information such as, for example, bit locations, bit numbers, etc., of the bits of the major system information. The UE processor module 168 is also coupled to the I/O interface 169, which provides the UE 104 with the ability to connect to other devices such as computers. The I/O interface 169 is the communication path between these accessories and the UE processor module 168.

In some embodiments, the UE 104 can operate in a hybrid communication network in which the UE communicates with the BS 102, and with other UEs, e.g., between 104a and 104b. As described in further detail below, the UE 104 supports sidelink communications with other UE's as well as downlink/uplink communications between the BS 102 and the UE 104. As discussed above, sidelink communication allows the UEs 104a and 104b to establish a direct communication link with each other, or with other UEs from different cells, without requiring the BS 102 to relay data between UE's.

Figure 2:
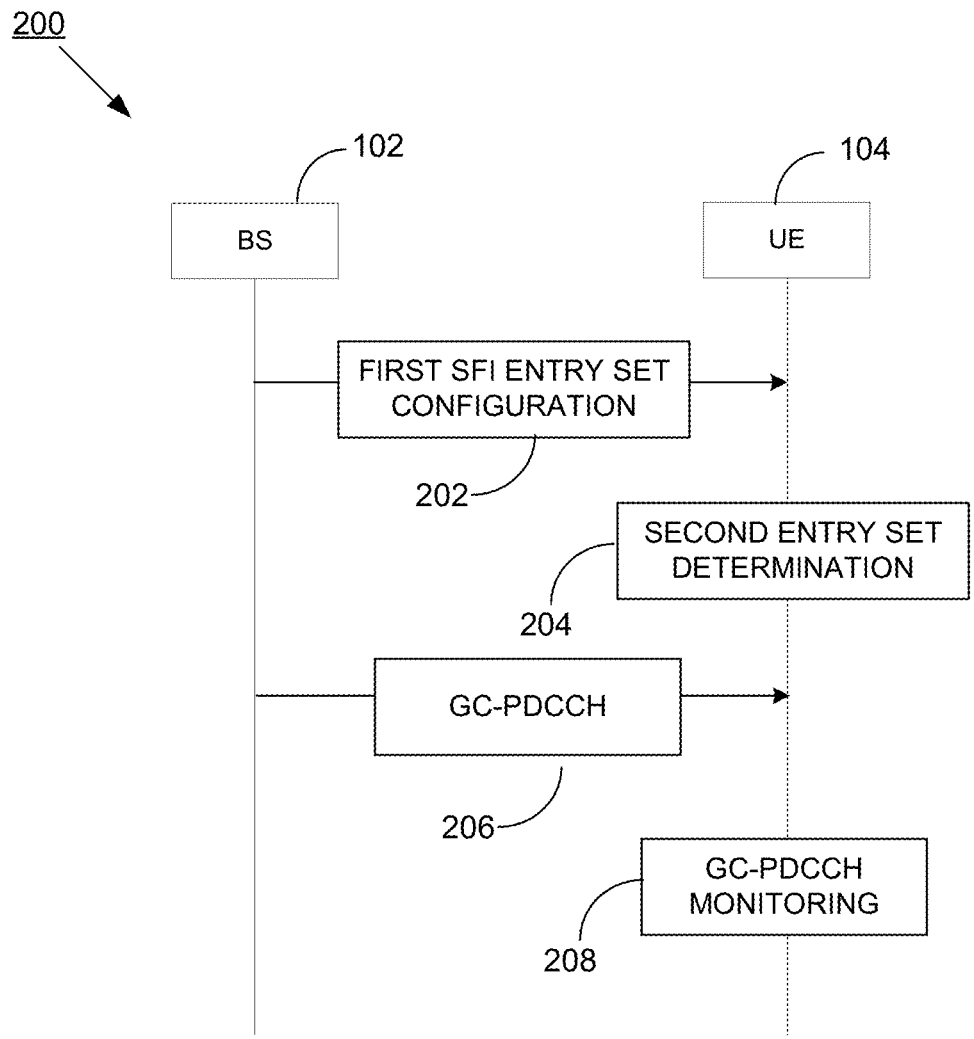
FIG. 2 illustrates a method of a slot structure information indication, in accordance with some embodiments of the present disclosure.

FIG. 2 illustrates a method 200 of a slot structure information indication, in accordance with some embodiments of the present disclosure. It is understood that additional operations may be provided before, during, and after the method 200 of FIG. 2, and that some other operations may be omitted or only briefly described herein.

The method 200 starts with operation 202 in which a BS 102 configures at least one first slot structure related information (SFI) entry set, which is used to indicate slot structure information for each transmission resource, e.g., component carrier, bandwidth part, or cell. In some embodiments, the transmission resource can be a time division duplex (TDD) transmission resource, and a frequency division duplex (FDD) transmission resource. As used herein, a "bandwidth part" refers to a part of a bandwidth in a wideband of frequency. In some embodiments, the FDD transmission resources can be a FDD downlink (DL) transmission resource, or a FDD uplink (UL) transmission resource. In some embodiment, the at least one first SFI entry set can be also used to indicate slot structure information of a group of transmission resources. In order to divide a plurality of transmission resources into groups, at least one of the following rules can be used. In some embodiments, TDD transmission resources can form a group, and FDD transmission resources can form another group. Alternatively, TDD transmission resources can form a group, and FDD DL transmission resources can form another group, and FDD UL transmission resources can form another group. In some embodiments, a group comprises one TDD transmission resource, and at least one FDD transmission resource, and the other group comprises the other TDD transmission resource, and at least one the other FDD transmission resource. In some embodiments, the plurality of transmission resources only forms one group. In certain embodiments, each of the plurality of transmission resources can be a group, such that the number of groups equals the number of transmission resources. Furthermore, a group can comprise transmission resources that are located in a predefined frequency range or in a predefined index range.

In some embodiments, a plurality of SFI entry sets can be a plurality of slot format related information (SFI) tables, wherein the plurality of SFI tables can be the same or different. In some embodiments, the plurality of SFI tables can be pre-defined, or semi-statically configured. As used herein, "semi-statically configured" means the setting is configure through a higher layer signaling by the BS 102. In some embodiments, the plurality of SFI tables can be derived from a plurality of different SFI tables. In some embodiments, at least one SFI entry set comprises a first number of SFI entries.

The method 200 continues with operation 204, in which the UE 104 derives at least one second SFI entry set based on the at least one first SFI entry set configured by the BS 102, in accordance with some embodiments. The at least one first SFI entry set can be at least one first SFI table. When the at least one first SFI table configured by the BS 102 comprises at least one TDD SFI table with a number of entries, the UE 104 determines the at least one second SFI table, which can be a FDD SFI table with a number of entries, according to at least one of the following rules: entries in the at least one TDD SFI table with two switching points are not included in the at least one FDD SFI table; entries in the at least one TDD SFI table with one switching point including both downlink (DL) and uplink (UL) are not included in the at least one FDD SFI table; entries in the at least one TDD SFI table with zero switching point including transmission directions (e.g., UL or DL) that are different from the transmission directions used in the at least one FDD transmission resource, or at least one group of FDD transmission resources, are not included in the at least one FDD SFI table.

In some embodiments, the number of orthogonal frequency division multiplexing (OFDM) symbols representing the transmission directions (e.g., UL, DL and OTHER, wherein OTHER can be UNKNOWN) in an entry of the at least one TDD SFI table configured by the BS 102 and the at least one FDD SFI table determined by the UE 104 are related. In some embodiments, the number of OFDM symbols representing downlink transmission (i.e., DL) in an entry of the at least one TDD SFI table is the same as the number of OFDM symbols representing uplink transmission (i.e., UL) in an entry of the at least one FDD SFI table. In some embodiments, the number of OFDM symbols representing uplink transmission (i.e., UL) in an entry of the at least one TDD SFI table is the same as the number of OFDM symbols representing downlink transmission (i.e., DL) in an entry of the at least one FDD SFI table. In some embodiments, the number of OFDM symbols representing OTHER (i.e., OTHER) in an entry of the at least one TDD SFI table is the same as the number of OFDM symbols representing uplink transmission (i.e., OTHER) in an entry of the at least one FDD SFI table. In some embodiments, the number of OFDM symbols representing downlink transmission (i.e., DL) in an entry of the at least one TDD SFI table is the same as the number of OFDM symbols representing downlink transmission (i.e., DL) in an entry of the at least one FDD SFI table. In some embodiments, the number of OFDM symbols representing uplink transmission (i.e., UL) in an entry of the at least one TDD SFI table is the same as the number of OFDM symbols representing uplink transmission (i.e., UL) in an entry of the at least one FDD SFI table.

Furthermore, OFDM symbol position in a slot or a slot segment in an entry of the at least one TDD SFI table configured by the BS 102 is different from the OFDM symbol position in a slot or slot segment in an entry of the FDD SFI table determined by the UE 104. Specifically, when the OFDM symbol position of D is before the OFDM symbol position of OTHER in a slot or a slot segment in an entry of the at least one TDD SFI table, the OFDM symbol position of U is after the OFDM symbol position of OTHER in a slot or a slot segment in an entry of the at least one FDD SFI table. For another example, when the OFDM symbol position of U is after the OFDM symbol position of OTHER in a slot or a slot segment in an entry of the at least one TDD SFI table, the OFDM symbol position of D is before the OFDM symbol position of OTHER in a slot or a slot segment in an entry of the at least one FDD SFI table. As one can see, the OFDM symbol position of OTHER in an entry of the at least one TDD SFI table is the same as the OFDM symbol position of OTHER in an entry of the at least one FDD SFI table, after doing some cyclic shift to the OFDM symbol position of OTHER in an entry of the at least one FDD SFI table, according to certain embodiments.

The at least one FDD SFI table determined by the UE 104 is a subset of the at least one TDD SFI table configured by the BS 102, in some embodiments. In certain embodiments, some part of the entries in the at least one FDD SFI table is a subset of the least one TDD SFI table. In some other embodiments, the at least one FDD SFI table comprising the above-mentioned structures is a subset of the at least one TDD SFI table.

When the at least one first SFI table configured by the BS 102 comprises at least one FDD DL SFI table, the UE 104 determines the at least one second SFI table, which can be a FDD UL table. In some embodiments, the numbers of orthogonal frequency division multiplexing (OFDM) symbols representing the transmission directions (e.g., U, D and OTHER) in an entry of the at least one FDD DL SFI table configured by the BS 102 and an entry of the at least one FDD UL SFI table determined by the UE 104 are related. In some embodiments, the number of OFDM symbols of D in an entry of the at least one FDD DL SFI table is the same as the number of OFDM symbols of U in an entry of the at least one FDD UL SFI table. In some embodiments, the number of OFDM symbols of OTHER in an entry of the at least one FDD DL SFI table is the same as the number of OFDM symbols of OTHER in an entry of the at least one FDD UL SFI table.

Similarly, the OFDM symbol position in a slot or a slot segment in an entry of the at least one FDD DL SFI table is different from the OFDM symbol position in a slot or slot segment in an entry of the FDD UL SFI table. Specifically, when the OFDM symbol position of D is before the OFDM symbol position of OTHER in a slot or a slot segment in an entry of the at least one FDD DL SFI table, the OFDM symbol position of U is after the OFDM symbol position of OTHER in a slot or a slot segment in an entry of the at least one FDD UL SFI table. The OFDM symbol position of OTHER in an entry of the at least one FDD DL SFI table is the same as the OFDM symbol position of OTHER in an entry of the at least one FDD UL SFI table, after doing some cyclic shift to the OFDM symbol position of OTHER in an entry of the at least one FDD UL SFI table, according to certain embodiments.

The number of entries of the at least one FDD DL SFI table is the same as the number of entries of the at least one FDD UL SFI table, according to some embodiments. The number of entries of the at least one FDD DL SFI table that has the property as discussed above is the same as the number of entries of the at least one FDD UL SFI table, according to some embodiments.

When the at least one first SFI table configured by the BS 102 comprises at least one FDD UL SFI table, the UE 104 determines the at least one second SFI table, which can be a FDD DL table. In some embodiments, the numbers of orthogonal frequency division multiplexing (OFDM) symbols representing the transmission directions (e.g., U, D and OTHER) in an entry of the at least one FDD UL SFI table configured by the BS 102 and an entry of the at least one FDD DL SFI table determined by the UE 104 are related. In some embodiments, the number of OFDM symbols of U in an entry of the at least one FDD UL SFI table is the same as the number of OFDM symbols of D in an entry of the at least one FDD DL SFI table. In some embodiments, the number of OFDM symbols of OTHER in an entry of the at least one FDD UL SFI table is the same as the number of OFDM symbols of OTHER in an entry of the at least one FDD DL SFI table.

Similarly, the OFDM symbol position in a slot or a slot segment in an entry of the at least one FDD UL SFI table is different from the OFDM symbol position in a slot or slot segment in an entry of the FDD DL SFI table. Specifically, the OFDM symbol position of U is after the OFDM symbol position of OTHER in a slot or a slot segment in an entry of the at least one FDD UL SFI table, the OFDM symbol position of D is before the OFDM symbol position of OTHER in a slot or a slot segment in an entry of the at least one FDD DL SFI table. The OFDM symbol position of OTHER in an entry of the at least one FDD UL SFI table is the same as the OFDM symbol position of OTHER in an entry of the at least one FDD DL SFI table, after shifting the OFDM symbol position of OTHER with the OFDM symbol position of U or D in an entry of the at least one FDD DL SFI table, according to certain embodiments.

The number of entries of the at least one FDD UL SFI table is the same as the number of entries of the at least one derived FDD DL SFI table, according to some embodiments. The number of entries of the at least one FDD UL SFI table that has the property as discussed above is the same as the number of entries of the at least one derived FDD DL SFI table.

In some embodiments, the first SFI entry set can be pre-defined by the BS 102 with a total entry number of X. The BS 102 semi-statically configures some SFI entries from the first SFI entry set to the UE 104 using a higher-layer signaling, for example a bitmap with a length of X, according to some embodiments. In some embodiments, the BS 102 semi-statically configures some SFI entries from a second SFI entry set to the UE 104 using a higher-layer signaling, for example a bit map with a length of X1. In some embodiments, X1 can be equal to or smaller than X. In some embodiments, the X1 number of entries can be a subset or a fullset of the X number of entries.

Entries of the first SFI entry set with X entries configured with two switching points are not included in entries of the second SFI entry set with X1 entries; entries of the first SFI entry set with X entries configured with one switching point including both D and U are not included in the entries of the second SFI entry set with X1 entries; entries of the first SFI entry set with X entries configured with zero switching point including transmission directions (e.g., U or D) are not included in entries of the second SFI entry set with X1 entries.

In some embodiments, the numbers of OFDM symbols representing the transmission directions (e.g., U, D and OTHER) in an entry of the first SFI entry set with X entries and in an entry of the second SFI entry set with X1 entries are related. In some embodiments, the number of OFDM symbols of D in an entry of the first SFI entry set with X entries is the same as the number of OFDM symbols of U in an entry of the second SFI entry set with X1 entries. In some embodiments, the number of OFDM symbols of U in an entry of the first SFI entry set with X entries is the same as the number of OFDM symbols of D in an entry of the second SFI entry set with X1 entries. In some embodiments, the number of OFDM symbols of OTHER in an entry of the first SFI entry set with X entries is the same as the number of OFDM symbols of OTHER in an entry of the second SFI entry set with X1 entries. In some embodiments, the number of OFDM symbols of D in an entry of the first SFI entry set with X entries is the same as the number of OFDM symbols of D in an entry of the second SFI entry set with X1 entries. In some embodiments, the number of OFDM symbols of U in an entry of the first SFI entry set with X entries is the same as the number of OFDM symbols of U in an entry of the second SFI entry set with X1 entries.

Furthermore, the OFDM symbol position in a slot or a slot segment in an entry of the first SFI entry set with X entries is different from the OFDM symbol position in a slot or slot segment in an entry of the second SFI entry set with X1 entries. Specifically, when the OFDM symbol position of D is before the OFDM symbol position of OTHER in a slot or a slot segment in an entry of the first SFI table, the OFDM symbol position of U is after the OFDM symbol position of OTHER in a slot or a slot segment in an entry of the second SFI entry set with X1 entries. For another example, when the OFDM symbol position of U is after the OFDM symbol position of OTHER in a slot or a slot segment in an entry of the first SFI entry set with X entries, the OFDM symbol position of D is before the OFDM symbol position of OTHER in a slot or a slot segment in an entry of the second SFI entry set with X1 entries. As one can see, the OFDM symbol position of OTHER in an entry of the first SFI entry set with X entries is the same as the OFDM symbol position of OTHER in an entry of the second SFI entry set with X1 entries, after shifting the OFDM symbol position of OTHER with the OFDM symbol position of U or D in an entry of the second SFI entry set with X1 entries, according to certain embodiments.

The method 200 continues with operation 206, in which a PDCCH carrying at least one SFI field is transmitted from the BS 102 to the UE 104, in accordance with some embodiments. The PDCCH is transmitted on a first transmission resource with a first numerology and a first subcarrier spacing (SCS) and the at least one SFI field refers to at least one SFI table indicating at least one second transmission resource with at least one second numerology and at least one second SCS. In some embodiments, the PDCCH can be a group-common PDCCH (GC-PDCCH), a common PDCCH (C-PDCCH), or a UE-specific PDCCH (UE-PDCCH).

In some embodiments, when a plurality of SFI fields are carried on a PDCCH (e.g., GC-PDCCH), the plurality of SFI fields can be used to refer to a plurality of SFI tables that are different from each other. In some embodiments, the plurality of SFI fields can be used to refer to a same SFI table.

In some embodiments, when there is only one SFI field carried on the PDCCH (e.g., GC-PDCCH) transmitted by the BS 102 to the UE 104, the SFI field can be used by the UE 104 to derive the corresponding slot structure of a transmission resource according to the corresponding SFI table. In some embodiments, when only one SFI field is carried on the PDCCH transmitted by the BS 102 to the UE 104, the SFI field can be also used by the UE 104 to drive corresponding slot structures for a plurality of transmission resources according to a plurality of corresponding SFI tables.

In operation 206, the BS 102 further configures a period of the PDCCH (e.g., GC-PDCCH) monitoring occasion, which equals K slots, where the K slots each has a slot length. The slot length can be the slot length of one of the following: the first numerology of the first transmission resource carrying the at least one SFI field, one of the at least one second numerology of the at least one second transmission resources indicated by the at least one SFI field, or a third numerology, wherein the third numerology can be a reference numerology pre-defined by the BS 102, a fourth numerology corresponding to a maximum SCS or a minimum SCS within a plurality of transmission resources that are supported by the BS 102 or the UE 104.

Figure 3A:
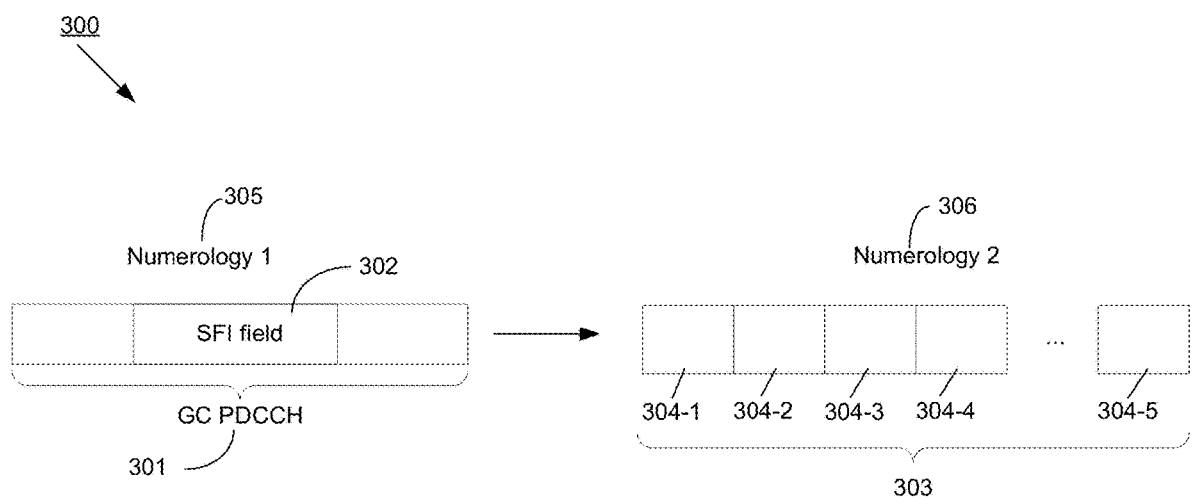
FIG. 3A illustrates a GC-PDCCH carrying only one SFI field indicating one transmission resource, in accordance with some embodiments of the present disclosure.

FIG. 3A illustrates a GC-PDCCH 301 carrying only one SFI field 302 indicating one transmission resource 303, in accordance with some embodiments of the present disclosure. There is a first transmission resource that carries a GC-PDCCH 301 with a first SCS (SCS1) and a first numerology 305, wherein the GC-PDCCH 301 contains one SFI field 302. A second transmission resource 303 indicated by the SFI field 302 on the GC-PDCCH 301 has a second SCS (SCS2) and a second numerology 306. For the second transmission resource 303, according to the second numerology 306, one slot comprises a plurality of OFDM symbols (e.g., 304-1, 304-2, 304-3, 304-4, 304-5). Although only 5 OFDM symbols are shown, it should be noted that any number of OFDM symbols can be included in one slot are in the scope of this invention. When the SCS1>SCS2, the period of the GC-PDCCH monitoring occasion that configured by the BS 102 is defined as K1 slots, where the K1 slots each has a slot length. The slot length can be the slot length of one of the following: the first numerology 305, the second numerology 306, or a third numerology, wherein the third numerology can be a reference numerology pre-defined by the BS 102, a maximum SCS or a minimum SCS within at least one of the following numerology: the numerology 306, or a plurality of numerologies supported by the BS 102 or the UE 104. In some embodiments, K1 can be one of the following:

K1=a×k, wherein k is a positive integer and pre-defined by the BS 102, or semi-statically configured by the BS 102, wherein a can be semi-statically configured by the BS 102 to the UE 104, or calculated based on SCS1/SCS2.

K1=a×k×x, wherein k is a positive integer, e.g., 1 or a value pre-defined by the BS 102, or semi-statically configured by the BS 102, wherein x has a value pre-defined by the BS 102, or semi-statically configured by the BS 102 (e.g., 1, 2, 5, 10, 20, 40, 8, 16, and 32), wherein a can be semi-statically configured by the BS 102 to the UE 104, or calculated based on SCS1/SCS2.

$K1=2^b \times x$, wherein b is a positive integer, and can be pre-defined by the BS 102 or semi-statically configured by the BS 102, or can be calculated by $\log_2(SCS1/SCS2)$, wherein x has a value pre-defined by the BS 102, or is one of the values semi-statically configured by the BS 102, e.g., 1, 2, 5, 10, 20, 40, 8, 16, and 32.

In some embodiments, when the SCS2>SCS1, the period and K1 can be determined using the equations above. In this case, a in the above equations equals 1, b equals 0, and x has a value pre-defined by the BS 102, or semi-statically configured by the BS 102 (e.g., 1, 2, 5, 10, 20, 40, 8, 16, and 32).

In some embodiments, the period of the GC-PDCCH monitoring occasion that configured by the BS 102 is defined as K1 slots, where the K1 slots each has a slot length of the numerology 306, wherein K1 has a value which can be pre-defined by the BS 102 or is one of the values semi-statically configure by the BS 102, e.g., 1, 2, 5, 10, 20, 40, 8, 16, and 32.

Referring again to FIG. 2, the method 200 continues operation 208 in which the UE 104 monitors the GC-PDCCH on slots according to the period K1 of the GC-PDCCH monitoring occasion configured by the BS 102. Referring to FIG. 3A, the UE 104 monitors the GC-PDCCH and receives the SFI field 302, the UE 104 refers to the corresponding SFI table and further determines the slot structure of a second transmission resource with a numerology which equals to the second numerology 306.

Figure 3B:
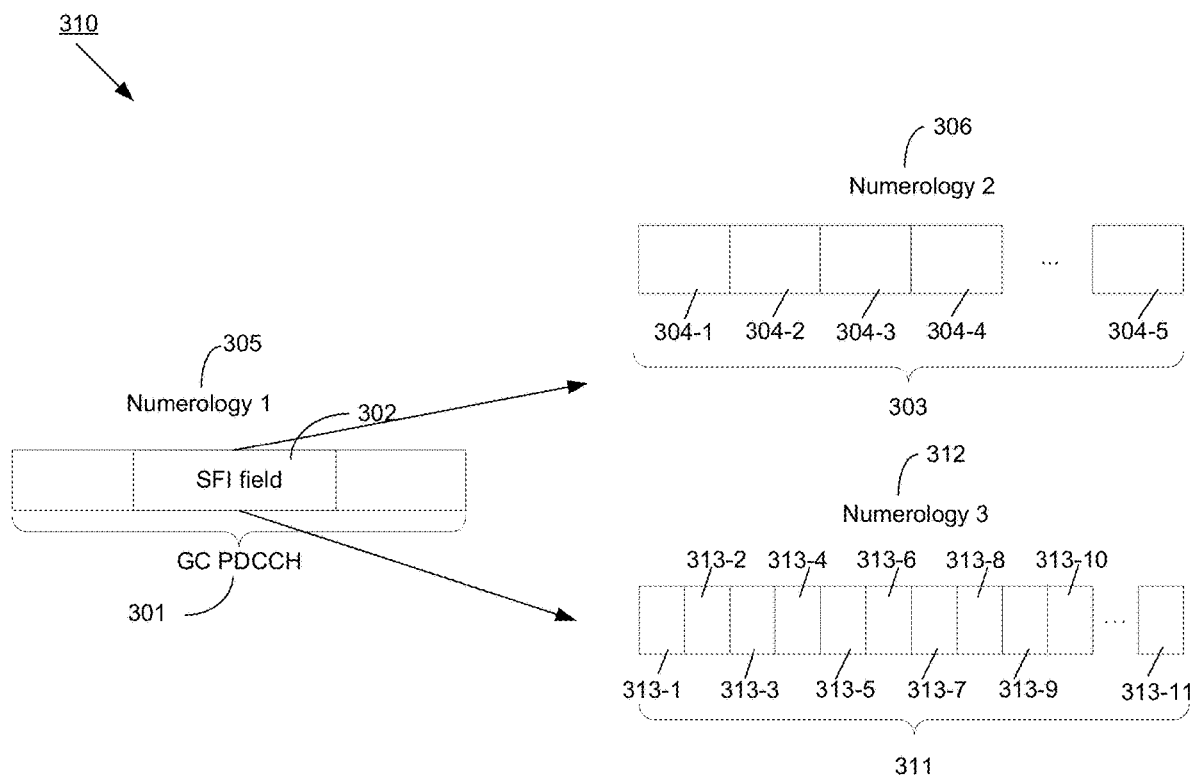
FIG. 3B illustrates a GC-PDCCH carrying only one SFI field 302 indicating two transmission resources, in accordance with some embodiments of the present disclosure.

FIG. 3B illustrates a GC-PDCCH 301 carrying one SFI field 302 indicating two transmission resources 303 and 311, in accordance with some embodiments of the present disclosure. There is a first transmission resource that carries a GC-PDCCH 301 with a first SCS (SCS1) and a first numerology (Numerology 1) 305, wherein the GC-PDCCH 301 contains one SFI field 302. Two transmission resources, a second transmission resource 303 and a third transmission resource 311 indicated by the SFI field 302 on the GC-PDCCH 301 has a second SCS (SCS2) and a third SCS (SCS3), a second numerology (Numerology 2) 306 and a third numerology (Numerology 3) 312, respectively. For the second transmission resource 303, according to the second numerology 306, one slot comprises a plurality of OFDM symbols (e.g., 304-1, 304-2, 304-3, 304-4, and 304-5). For the third transmission resource 311, according to the third numerology 312, one slot comprises a plurality of OFDM symbols (e.g., 331-1, 313-2, 313-3, 313-4, 313-5, 313-6, 313-7, 313-8, 313-9, 313-10, and 313-11). It should be noted that any number of OFDM symbols can be included in the second and third transmission resources 303 and 311, which are in the scope of this invention.

The period of the GC-PDCCH monitoring occasion that configured by the BS 102 is defined as K2 slots, where the K2 slots each has a slot length. The slot length can be the slot length in one of the following: the first numerology 305, one of the values of the second numerology 306 and the third numerology 312, or a fourth numerology, wherein the fourth numerology can be a reference numerology per-defined by the BS 102, a maximum SCS or a minimum SCS within a plurality of numerologies, which can be one of the following the second numerology 306, the third numerology 312, or a plurality of numerologies that are supported by the BS 102 or the UE 104. In some embodiments, K2 can be one of the following:

K2=max(a1,a2,1)×k, wherein k is a positive integer and pre-defined by the BS 102, or semi-statically configured by the BS 102, wherein max(a1,a2,1) can be semi-statically configured by the BS 102 to the UE 104, or calculated based on SCS1/SCS2 and SCS1/SCS3, wherein the a1 can be determined based on SCS1/SCS2, the a2 can be determined based on SCS1/SCS3.

K2=max(a1,a2,1)×k×x, wherein k is a positive integer, e.g., 1 or a value pre-defined by the BS 102, or semi-statically configured by the BS 102, wherein x has a value pre-defined by the BS 102, or semi-statically configured by the BS 102 (e.g., 1, 2, 5, 10, 20, 40, 8, 16, and 32), wherein max(a1,a2,1) can be semi-statically configured by the BS 102 to the UE 104, or calculated based on SCS1/SCS2 and SCS1/SCS3.

K2=$2^b$×x, wherein b is a positive integer, and can be pre-defined by the BS 102 or semi-statically configured by the BS 102, or can be calculated by max(log 2(a1), log 2(a2),0), wherein a1 and a2 can be semi-statically configured by the BS 102 to the UE 104, or calculated based on SCS1/SCS2 and SCS1/SCS3, and wherein x has a value pre-defined by the BS 102, or semi-statically configured by the BS 102 (e.g., 1, 2, 5, 10, 20, 40, 8, 16, and 32).

Referring again to FIG. 2, the method 200 continues to operation 208 in which the UE 104 monitors the GC-PDCCH on slots according to the period K2 of the GC-PDCCH monitoring occasion configured by the BS 102. Referring to FIG. 3B, when the UE 104 monitors the GC-PDCCH and receives the SFI field 302 at one monitoring occasion, the UE 104 determines the slot structures of the transmission resource 303 and 311 with a numerology 306 and 312 based on the received SFI field 302 that corresponds to SFI tables for the two transmission resources 303 and 311, respectively.

Figure 3C:
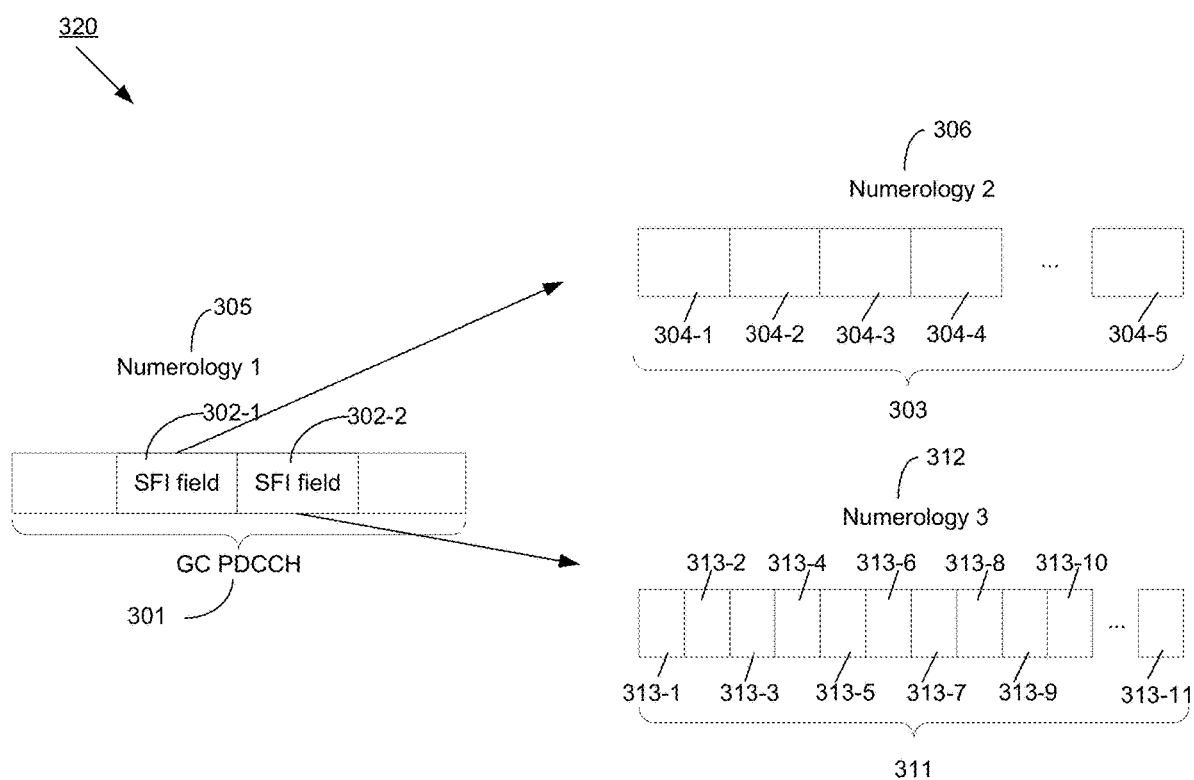
FIG. 3C illustrates a GC-PDCCH carrying two SFI fields indicating two transmission resources, in accordance with some embodiments of the present disclosure.

FIG. 3C illustrates a GC-PDCCH 301 carrying two SFI fields 302-1 and 302-2 indicating at least two transmission resources: a second transmission resource 303 and a third transmission resource 311, in accordance with some embodiments of the present disclosure. There is a first transmission resource that carries a GC-PDCCH 301 with a first SCS (SCS1) and a first numerology (Numerology 1) 305, wherein the GC-PDCCH 301 contains two SFI fields 302-1 and 302-2. Two transmission resources 303 and 311 are indicated by the SFI field 302-1 and 302-2, respectively. The two transmission resources 303 and 311 on the GC-PDCCH 301 has a second SCS (SCS2) and a second numerology (Numerology 2) 306, and a third SCS (SCS3) and a third numerology (Numerology 3) 312, respectively. For the second transmission resource 303, according to the second numerology 306, one slot comprises a plurality of OFDM symbols (e.g., 304-1, 304-2, 304-3, 304-4, and 304-5). For the third transmission resource 311, according to the third numerology 312, one slot comprises a plurality of OFDM symbols (e.g., 331-1, 313-2, 313-3, 313-4, 313-5, 313-6, 313-7, 313-8, 313-9, 313-10, and 313-11). It should be noted that any number of OFDM symbols can be included in the second and third transmission resources 303 and 311, which are in the scope of this invention.

The period of the GC-PDCCH monitoring occasion that configured by the BS 102 is defined as K3 slots, where the K3 slots each has a slot length. The slot length can be the slot length in one of the following: the first numerology 305, one of the values of the second numerology 306 and the third numerology 312, or a fourth numerology, wherein the fourth numerology can be a reference numerology per-defined by the BS 102, a maximum SCS or a minimum SCS within a plurality of numerologies, which can be one of the following numerology 306, numerology 312, or a plurality of numerologies supported by the BS 102 or the UE 104. In some embodiments, K3 can be one of the following:

K3=max(a1,a2,1)×k, wherein k is a positive integer and pre-defined by the BS 102, or semi-statically configured by the BS 102, wherein max(a1,a2,1) can be semi-statically configured by the BS 102 to the UE 104, or calculated based on SCS1/SCS2 and SCS1/SCS3.

K3=max(a1,a2,1)×k×x, wherein k is a positive integer, e.g., 1 or a value pre-defined by the BS 102, or semi-statically configured by the BS 102, wherein x has a value pre-defined by the BS 102, or semi-statically configured by the BS 102 (e.g., 1, 2, 5, 10, 20, 40, 8, 16, and 32), wherein max(a1,a2,1) can be semi-statically configured by the BS 102 to the UE 104, or calculated based on SCS1/SCS2 and SCS1/SCS3.

K3=$2^b$×x, wherein b is a positive integer, and can be pre-defined by the BS 102 or semi-statically configured by the BS 102, or can be calculated by max($\log_2$(a1), log 2(a2),0), wherein a1 and a2 can be semi-statically configured by the BS 102 to the UE 104, or calculated based on SCS1/SCS2 and SCS1/SCS3, and wherein x has a value pre-defined by the BS 102, or is one of the values semi-statically configured by the BS 102, e.g., 1, 2, 5, 10, 20, 40, 8, 16, and 32.

Referring again to FIG. 2, the method 200 continues to operation 208 in which the UE 104 monitors the GC-PDCCH on slots according to the period K3 of the GC-PDCCH monitoring occasion configured by the BS 102. Referring to FIG. 3C, when the UE 104 monitors the GC-PDCCH and receives the two SFI fields 302-1 and 302-2 at two different monitoring occasions, the UE 104 determines the slot structures of the transmission resource 303 and 311 with a numerology 306 and 312 based on the received SFI fields 302-1 and 302-2 that correspond to SFI tables for the two transmission resources 303 and 311, respectively.

Referring to FIG. 3C, in some embodiments, the period of the GC-PDCCH monitoring occasion that configured by the BS 102 is defined as K4 slots, where the K4 slots each has a slot length. The slot length can be the slot length in one of the following: the first numerology 305, one of the values of the second numerology 306 and the third numerology 312, or a fourth numerology, wherein the fourth numerology can be a reference numerology pre-defined by the BS 102, a maximum SCS or a minimum SCS within a plurality of numerologies, which can be one of the following the second numerology 306, the third numerology 312, or a plurality of numerologies that are supported by the BS 102 or the UE 104. In some embodiments, K4 can be one of the following:

K4=max(min(a1,a2),1)×k, wherein k is a positive integer and pre-defined by the BS 102, or semi-statically configured by the BS 102, wherein max(min(a1,a2),1) can be semi-statically configured by the BS 102 to the UE 104, or calculated based on SCS1/SCS2 and SCS1/SCS3.

K4=max(min(a1,a2),1)×k×x, wherein k is a positive integer, e.g., 1 or a value pre-defined by the BS 102, or semi-statically configured by the BS 102, wherein x has a value pre-defined by the BS 102, or semi-statically configured by the BS 102 (e.g., 1, 2, 5, 10, 20, 40, 8, 16, and 32), wherein max(min(a1,a2),1) can be semi-statically configured by the BS 102 to the UE 104, or calculated based on SCS1/SCS2 and SCS1/SCS3.

K4=$2^b$×x, wherein b is a positive integer, and can be pre-defined by the BS 102 or semi-statically configured by the BS 102, or can be calculated by max(min(log$_2$(a1), log 2(a2)),0), wherein a1 and a2 can be semi-statically configured by the BS 102 to the UE 104, or calculated based on SCS1/SCS2 and SCS1/SCS3, and wherein x has a value pre-defined by the BS 102, or is one of the values semi-statically configured by the BS 102, e.g., 1, 2, 5, 10, 20, 40, 8, 16, and 32.

Referring still to FIG. 2, the method 200 continues to operation 208 in which the UE 104 monitors the GC-PDCCH at monitoring occasions, which are defined as OFFSET+c×K4 slots, wherein OFFSET is a non-negative integer, and c is a non-negative integer (e.g. the slot index), and K4 slots is the period of the GC-PDCCH monitoring occasion, wherein K4 is a positive integer and configured as described above. The UE 104 can determine the DCI payload for the GC-PDCCH monitoring occasions according to at least one of the following: a1, a2, SCS1, SCS2, SCS3, and K4.

For a monitoring occasion that When c×K4 is an integer time of a1, but not an integer time of a2, the SFI field 302-1 corresponding to the second numerology 306 can be received by the UE 104. In this case, the BS 102 transmits the GC-PDCCH 301 and the UE 102 monitors the GC-PDCCH 301 by a first DCI payload.

For a monitoring occasion that When c×K4 is an integer time of a2, but not an integer time of a1, the SFI field 302-2 corresponding to the third numerology 312 can be received by the UE 104. In this case, the BS 102 transmits the GC-PDCCH 301 and the UE 102 monitors the GC-PDCCH 301 by a second DCI payload.

For a monitoring occasion that When c×K4 is an integer time of both a1 and a2, the two SFI fields 302-1 and 302-2 corresponding to the second and third numerologies 306 and 312 can be received by the UE 104. In this case, the BS 102 transmits the GC-PDCCH 301 and the UE 102 monitors the GC-PDCCH 301 by a third DCI payload.

The first DCI payload is equal to or smaller than the third DCI payload, according to certain embodiments. The second DCI payload is equal to or smaller than the third DCI payload, according to certain embodiments. The first DCI payload and the second DCI payload can be the same or different. Furthermore, the first, second and third DCI payload can have same or different DCI formats. The bit length of SFI field 302-1 and the bit length of SFI field 302-2 can be same or different.

When the UE 104 monitors the GC-PDCCH 301 and receives the SFI field 302-1 at a monitoring occasion with a selected DCI payload, the UE 104 determines the slot structures of the second transmission resources 303 with the second numerology 306 based on the received SFI fields 302-1 that correspond to a SFI table for the transmission resources 303. When the UE 104 monitors the GC-PDCCH 301 and receives the SFI field 302-2 at a monitoring occasion with a selected DCI payload, the UE 104 determines the slot structures of the third transmission resources 311 with the third numerology 312 based on the received SFI fields 302-2 that correspond to a SFI table for the transmission resources 311. when the UE 104 monitors the GC-PDCCH 301 and receives the SFI fields 302-1 and 302-2 at one monitoring occasion with a selected DCI payload, the UE 104 determines the slot structures of the transmission resource 303 and 311 with a numerology 306 and 312 based on the received SFI field 302 that corresponds to SFI tables for the two transmission resources 303 and 311, respectively.

Referring to FIG. 3C, in some embodiment, the period of the GC-PDCCH monitoring occasion that configured by the BS 102 is defined as K5 slots, where the K5 slots each has a slot length. The slot length can be the slot length in one of the following: the first numerology 305, one of the values of the second numerology 306 and the third numerology 312, or a fourth numerology, wherein the fourth numerology can be a reference numerology pre-defined by the BS 102, a maximum SCS or a minimum SCS within a plurality of numerologies, which can be one of the following the second numerology 306, the third numerology 312, or a plurality of numerologies that are supported by the BS 102 or the UE 104. In some embodiments, K5 can be one of the following:

K5=max(min(a1,a2),1)×k, wherein k is a positive integer and pre-defined by the BS 102, or semi-statically configured by the BS 102, wherein max(min(a1,a2),1) can be semi-statically configured by the BS 102 to the UE 104, or calculated based on SCS1/SCS2 and SCS1/SCS3.

K5=max(min(a1,a2),1)×k×x, wherein k is a positive integer, e.g., 1 or a value pre-defined by the BS 102, or semi-statically configured by the BS 102, wherein x has a value pre-defined by the BS 102, or semi-statically configured by the BS 102 (e.g., 1, 2, 5, 10, 20, 40, 8, 16, and 32), wherein max(min(a1,a2),1) can be semi-statically configured by the BS 102 to the UE 104, or calculated based on SCS1/SCS2 and SCS1/SCS3.

K5=$2^b$×x, wherein b is a positive integer, and can be pre-defined by the BS 102 or semi-statically configured by the BS 102, or can be calculated by max(min(log$_2$(a1), log 2(a2)),0), wherein a1 and a2 can be semi-statically configured by the BS 102 to the UE 104, or calculated based on SCS1/SCS2 and SCS1/SCS3, and wherein x has a value pre-defined by the BS 102, or is one of the values semi-statically configured by the BS 102, e.g., 1, 2, 5, 10, 20, 40, 8, 16, and 32.

Referring to FIG. 2, the method 200 continues operation 208 in which the UE 104 monitors the GC-PDCCH 301 at monitoring occasions with a fixed DCI payload carrying both the SFI fields 302-1 and 302-2. At some of the monitoring occasions, the SFI fields 302-1 or 302-2 are filled with predefined values. In some embodiments, the predefined values can be a number of bits "1" or a number of bits "0". The bit length of SFI field 302-1 and the bit length of SFI field 302-2 can be same or different. When the UE 104 monitors the GC-PDCCH 301 and receives the two SFI fields 302-1 and 302-2 at one monitoring occasion, the UE 104 determines the slot structures of the transmission resource 303 and 311 with a numerology 306 and 312 based on the received SFI field 302-1 and 302-2 that correspond to two different SFI tables for the two transmission resources 303 and 311, respectively. If anyone of the SFI fields is the predefined values, which means there is not any SFI indication in this SFI field.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the some illustrative logical blocks, modules, processors, means, circuits, methods and functions described in connection with the aspects disclosed herein can be implemented by electronic hardware (e.g., a digital implementation, an analog implementation, or a combination of the two, which can be designed using source coding or some other technique), various forms of program or design code incorporating instructions (which can be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware, firmware or software, or a combination of these technique, depends upon the particular application and design constraints imposed on the overall system. Skilled artisans can implement the described functionality in various ways for each particular application, but such implementation decisions should not be interpreted as causing a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A method performed by a wireless communication node, comprising:
configuring a first slot format related information (SFI) entry set to a wireless communication device, wherein the first SFI entry set contains slot structure information of at least one transmission resource; and
transmitting a physical channel to the wireless communication device, wherein the physical channel comprises at least one SFI field, wherein
the at least one SFI field corresponds to a plurality of SFI entry sets that are different from each other,
the at least one SFI field is determined based on a first downlink control information (DCI) payload, the first DCI payload is determined by the wireless communication device based on a second DCI payload, and the second DCI payload is a value configured by the wireless communication node.

2. The method of claim 1, wherein:

the at least one SFI field is one single SFI field corresponding to the plurality of SFI entry sets; and the plurality of SFI entry sets comprises the first SFI entry set and a second SFI entry set.

3. The method of claim 1, wherein:

the at least one SFI field is a plurality of SFI fields each of which corresponding to a respective one of the plurality of SFI entry sets; and the plurality of SFI entry sets comprises the first SFI entry set and a second SFI entry set.

4. The method of claim 2, wherein each of the plurality of SFI entry sets comprises at least one of the following elements: downlink (DL) OFDM symbols, uplink (UL) OFDM symbols, OTHER OFDM symbols, DL OFDM symbols and OTHER OFDM symbols, and UL OFDM symbols and OTHER OFDM symbols.

5. The method of claim 4, wherein a relationship between OFDM symbols in the first SFI entry set and OFDM symbols in the second SFI entry set comprises one of the following: the number of DL OFDM symbols in the entry of the first SFI entry set equals the number of UL OFDM symbols in the entry of the second SFI entry set, the number of UL OFDM symbols in the entry of the first SFI entry set equals the number of DL OFDM symbols in the entry of the second SFI entry set, the number of DL OFDM symbols in the entry of the first SFI entry set equals the number of DL OFDM symbols in the entry of the second SFI entry set, the number of UL OFDM symbols in the entry of the first SFI entry set equals the number of uplink OFDM symbols in the entry of the second SFI entry set, and the number of OTHER OFDM symbols in the entry of the first SFI entry set equals the number of OTHER OFDM symbols in the entry of the second SFI entry set.

6. The method of claim 4, wherein:

each entry of the first SFI entry set corresponds to DL OFDM symbols or OTHER OFDM symbols; and each entry of the second SFI entry set corresponds to UL OFDM symbols or OTHER OFDM symbols.

7. The method of claim 1, wherein the at least one SFI field refers to an SFI table.

8. A wireless communication node comprising at least one processor and a memory, wherein the memory stores instructions that, when executed, cause the at least one processor to:

configure a first slot format related information (SFI) entry set to a wireless communication device, wherein the first SFI entry set contains slot structure information of at least one transmission resource; and transmit a physical channel to the wireless communication device, wherein the physical channel comprises an SFI field, wherein the SFI field corresponds to a plurality of SFI entry sets that are different from each other, the SFI field is determined based on a first downlink control information (DCI) payload, the first DCI payload is determined by the wireless communication device based on a second DCI payload, and the second DCI payload is a value configured by the wireless communication node.

9. The wireless communication node of claim 8, wherein the SFI field refers to an SFI table.

10. A non-transitory computer-readable medium having stored thereon computer-executable instructions for carrying out the method of any one of claims 1-3, 4-6 and 7.

* * * * *